United States Patent Office 2,759,926
Patented Aug. 21, 1956

2,759,926

SUBSTITUTED AMINO PHENYLCYCLOALKENYL PROPANOLS

Walter Reppe and Otto Schlichting, Ludwigshafen (Rhine), Franz Westphal, Ludwigshafen (Rhine)-Oppau, and August Amann, Ludwigshafen (Rhine), Germany, assignors to Badische Anilin- & Soda-Fabrik Aktiengesellschaft, Ludwigshafen (Rhine), Germany No Drawing. Application January 5, 1954,
Serial No. 402,398

Claims priority, application Germany January 30, 1953

11 Claims. (Cl. 260—239)

This invention relates to a new and improved process for the production of basic substituted phenylcycloalkenyl propanols and phenylcycloalkyl propanols.

It is already known that 1-phenyl-1-cyclohexyl-3-piperidine-propanol-(1) or the corresponding pyrrolidine compound is obtained when 1-phenyl-3-piperidino-propanone-(1) or the analogous pyrrolidine compound is reacted with cyclohexyl magnesium halide.

According to another known process, a phenyl nucleus in the basic substituted 1.1-diphenylpropanols is reduced to a cyclohexyl radical.

The yields in both processes are unsatisfactory.

We have now found that basic substituted phenylcycloalkenyl-propanols or phenylcycloalkyl-propanols of the general formula:

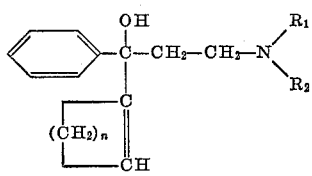

or

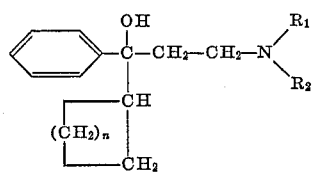

in which $n$ is an integer of at least 3 and preferably below 7 and $R_1$ and $R_2$ are alkyl groups or an alkylene chain combined into a ring with the nitrogen atom, are obtained in good yields by reacting Δ1.2-cycloalkenyl-methyl ketones with formaldehyde and simultaneously or subsequently with secondary amines or their mineral acid salts and then reacting the resultant basic substituted cycloalkenyl-propanones, by reaction with organometallic phenyl derivatives, into basic substituted phenylcycloalkenyl-propanols, the double linkage of the cycloalkenyl radical if desired being saturated before or after the first stage or after the second stage of the process.

Suitable initial materials are for example Δ1.2-cyclopropenyl-, Δ1.2-cyclobutenyl-, Δ1.2-cyclopentenyl-, Δ1.2-cyclohexenyl-, Δ1.2-cycloheptenyl- or Δ1.2-cyclooctenyl-methyl ketone. These are obtained in good yields for example by rearrangement of the corresponding ethinyl-cycloalkylols with organic or inorganic acids, such as formic acid, acetic acid, oxalic acid, phosphoric acid or sulfuric acid, at raised temperature.

According to the invention the cycloalkenyl-methyl ketones or cycloalkylmethyl ketones are condensed in the first stage with formaldehyde and organic bases or their mineral acid salts, as for example the hydrochloride, preferably at raised temperature and if desired in aqueous or organic solutions. The components are preferably heated under reflux for some hours and it is advantageous to add a small amount of an inorganic acid, as for example hydrochloric acid. The formaldehyde can be used either in concentrated aqueous solution or in the form of formaldehyde donors, such as paraformaldehyde.

Suitable amines are for example dimethylamine, diethylamine, pyrrolidine, piperidine, hexamethyleneimine or morpholine.

The conversion of the resultant basic substituted 1-(Δ1'.2'-cycloalkenyl) propanone-(1) compounds into the 1-phenyl-1-(Δ1'.2'-cycloalkenyl) propanols is effected in conventional manner by reaction with organometallic phenyl derivatives and for this purpose the Grignard compound, or especially suitably the lithium compound, may be used.

The addition of hydrogen to the double linkage of the cycloalkylene ring can be effected before, or better after, the treatment with formaldehyde and amine or salt thereof. It is carried out in the usual way with catalytically excited hydrogen.

The compounds prepared according to this invention, either as such or in the form of their water-soluble compounds obtained by treatment with inorganic or organic acids or by conversion into quaternary salts, are excellent spasmolytes, in particular for spasms of histaminic origin. They act both on the smooth muscular system of the intestine and also on guinea pigs rendered asthmatic by pilocarpin aerosol.

The following examples will further illustrate this invention but the invention is not restricted to these examples. The parts are parts by weight.

*Example 1*

80 parts of Δ1.2-cyclohexenyl-methyl ketone, 86 parts of piperidine hydrochloride, 29 parts of paraformaldehyde and 1.65 parts of concentrated hydrochloric acid are heated to boiling while stirring for an hour under reflux. A further 19.5 parts of paraformaldehyde are introduced and the whole is boiled for another two hours, filtered free from unreacted components while still hot and 150 parts of boiling acetone are added to the filtrate. Upon cooling slowly, the hydrochloride of 1-cyclohexenyl-3-piperidino-propanone-(1) crystallises out in large colorless crystals which after dissolution and reprecipitation from alcohol and ether melt at 186° to 187° C. The hydrochloride is dissolved in water, rendered alkaline and the separated base is taken up in ether, the ethereal solution dried over calcined potassium carbonate and the solvent evaporated. Distillation of the residue at 0.6 torr yields 88 parts of 1-(Δ1'.2'-cyclohexenyl)-3-piperidino-propanone-(1) having a boiling point of 105° to 107° C. at 0.6 torr.

88 parts of 1-(Δ1'.2'-cyclohexenyl)-3-piperidino-propanone-(1) are dissolved in 160 parts of absolute benzene and the solution is allowed to flow while stirring slowly and cooling with ice into a Grignard solution consisting of 133 parts of bromobenzene and 20.5 parts of magnesium in 350 parts of absolute ether, the whole being heated to boiling under reflux for two hours after the whole of the ketone has been added. It is then cooled with ice and hydrolysed with saturated aqueous ammonium chloride solution. The organic fraction is taken up in benzene, the benzene solution dried over potassium carbonate and the solvent evaporated in vacuo. 10 parts of unreacted ketone boiling at 105° to 115° C. at 0.4 torr are recovered from the residue. The residue then remaining consists of 98 parts of a very viscous oil which completely crystallizes upon standing overnight. The 1-(Δ1'.2'-cyclohexenyl)-1-phenyl-3-piperidino-propanol-(1) formed, melts at 95° to 96° C.

after recrystallization from alcohol and boils at 169° to 175° C. at 0.4 torr. The yield is 87 parts, i. e. 83% of the ketone reacted. The hydrochloride melts at 222° to 223° C. after recrystallization from alcohol and the methyl iodide melts at 172.5° to 174° C.

*Example 2*

74 parts of hexamethyleneimine hydrochloride are heated for an hour on a waterbath while stirring with 62 parts of Δ1.2-cyclohexenyl-methyl ketone and 57 parts of 40% aqueous formaldehyde solution. After cooling, it is diluted with water, made acid to congo with dilute hydrochloric acid and the aqueous solution extracted with ether to remove unreacted ketone. The aqueous solution is made alkaline with concentrated caustic soda solution, the keto base is taken up in ether, the ethereal solution washed with water and dried over calcined potassium carbonate. After evaporating the ether, 77 parts of 1-(Δ1'.2'-cyclohexenyl)-3-hexamethylene-imino-propanone-(1) boiling at 115° to 120° C. at 0.6 torr are obtained by distillation in vacuo. The hydrochloride melts at 175.5° to 177° C.

100 parts of 1-(Δ1'.2'-cyclohexenyl)-3-hexamethylene-iminopropanone-(1) are dissolved in 240 parts of absolute ether and the solution is allowed to flow slowly while cooling with ice into a Grignard solution consisting of 134 parts of bromobenzene and 20 parts of magnesium in 330 parts of absolute ether while stirring. The whole is stirred for 1 hour at room temperature and then 200 parts of absolute ether are distilled off and replaced by the same amount of benzene, the whole boiled for another 2 hours under reflux, cooled with ice and the reaction mixture hydrolysed with saturated ammonium chloride solution. The organic layer is separated and the aqueous layer extracted with benzene. After washing with water, the combined organic solutions are dried over potassium carbonate and the solvent evaporated under reduced pressure. 16 parts of unreacted basic ketone distil off from the residue at 0.6 torr. 99 parts of a fraction of higher boiling point are obtained. This is dissolved in absolute ether and treated with gaseous chlorine or chlorine dissolved in alcohol, whereby the hydrochloride of 1-(Δ1'.2'-cyclohexenyl)-1-phenyl-3-hexamethyleneimino-propanol-(1) having the melting point 182° to 184° C. is precipitated.

*Example 3*

100 parts of ethinyl-cyclo-octanol are heated in dilute formic acid under reflux until it begins to boil. After removing the source of heat, rearrangement takes place with vigorous boiling while the reaction mixture darkens in color at the same time. When the main reaction has subsided, it is boiled for some time under reflux, the dilute formic acid is distilled off in vacuo, the residue diluted with ether, the ethereal solution washed until neutral and dried over sodium sulfate. After evaporating the ether there are obtained 77 parts of Δ1.2-cyclo-octenyl-methyl ketone (boiling point at 16 torr=109° to 111° C.; melting point of the semicarbazone=211° to 212° C.). 50 parts of this Δ1.2-cyclo-octenyl-methyl ketone are boiled for an hour under reflux while stirring with 14.7 parts of paraformaldehyde and 49 parts of hexamethyleneimine hydrochloride in 89 parts of absolute alcohol. A further 9.8 parts of paraformaldehyde and 0.7 part of concentrated hydrochloric acid are added to the reaction mixture which is then boiled for another two hours. The alcohol is then distilled off under reduced pressure and the residue is dissolved in water and extracted with ether. After working up the ethereal solution, 7 parts of unreacted Δ1.2-cyclo-octenyl-methyl ketone are recovered. The aqueous solution is made alkaline and the separated basic components taken up in ether. After drying the ethereal solution over potassium carbonate and evaporating the solvent, there are obtained from the residue 50 parts of 1-(Δ1'.2'-cyclo-octenyl)-3-hexamethyleneimino-propanone-(1) having the boiling point 110° to 115° C. at 0.4 torr.

The air is expelled, by means of nitrogen, from a three-necked flask provided with a reflux condenser, a stirrer, a dropping device and an inlet pipe for nitrogen, and there is then introduced a solution of phenyl lithium in absolute ether (containing 2 parts of lithium), whereupon 50 parts of 1-( 1'.2'-cyclo-octenyl)-3-hexamethylene-imino-propanone-(1) dissolved in 110 parts of absolute ether are allowed to flow in slowly while stirring and cooling with ice. The whole is then boiled under reflux for 1½ hours and the reaction mixture cooled, hydrolyzed with water, made strongly alkaline and extracted with ether. The combined ethereal solutions are washed with water, dried over calcined potassium carbonate and evaporated. 4 parts of unreacted basic ketone are recovered by distilling the residue under reduced pressure. The fraction of higher boiling point consists of 57 parts of 1-(Δ1'.2'-cyclo-octenyl)-1-phenyl-3-hexamethyleneimino-propanol-(1). By dissolving it in alcoholic hydrochloric acid and adding absolute ether, the hydrochloride is obtained in the form of beautiful colorless crystals which melt at 197° to 198° C.

*Example 4*

61 parts of cyclo-octyl-methyl ketone, 18 parts of paraformaldehyde and 48.5 parts of piperidine hydrochloride in 105 parts of absolute alcohol are heated under reflux while stirring. After an hour, a further 12 parts of paraformaldehyde and 0.8 part of concentrated hydrochloric acid are added and the whole boiled for another two hours under reflux. The alcohol is distilled off under reduced pressure, the residue is dissolved in water and the solution extracted repeatedly with ether, made alkaline and the separated base taken up in ether. The ethereal solution is washed with water, dried over calcined potassium carbonate and freed from ether. By distilling the residue in vacuo there are obtained 54 parts of 1-cyclo-octyl-3-piperidino-propanone-(1) having the boiling point 124° to 128° C. at 0.4 torr.

54 parts of 1-cyclo-octyl-3-piperidino-propanone-(1) are allowed to flow slowly while cooling and stirring into a Grignard solution prepared from 68 parts of bromobenzene and 10 parts of magnesium in 200 parts of ether and the whole stirred for 2 hours at room temperature. 150 parts of ether are then distilled off and the volume made up by adding the same amount of pure benzene; the whole is then boiled for an hour under reflux and the reaction mixture cooled and hydrolyzed with saturated ammonium chloride solution. The organic fraction is separated, the aqueous solution is exhaustively extracted with benzene and the combined organic solutions are washed with water, dried over potassium carbonate and evaporated under reduced pressure. From the residue, after distilling off 36 parts of unreacted ketone, 23 parts of crude 1-cyclo-octyl-1-phenyl-3-piperidino-propanol-(1) are obtained of which the hydrochloride melts at 256° to 257° C. after dissolution and precipitation from a mixture of alcohol and ether.

By starting from Δ1.2-cyclohexenyl-methyl ketone, there are obtained in an analogous way by using the hydrochloric acid salts of pyrrolidine or diethylamine, 1 - (Δ1'.2'-cyclohexenyl)-1-phenyl-3-pyrrolidino-propanol-(1) or 1-(Δ1'.2'-cyclohexenyl)-1-phenyl-3-diethylamino-propanol-(1) of which the hydrochlorides melt at 189° to 190° C. and 189.5° to 190° C., respectively, and the methyl iodides at 165° to 166° C. and 158° to 160° C., respectively. Similarly by using dimethylamine hydrochloride there is obtained 1-(Δ1'.2'-cyclohexenyl)-1-phenyl-3-dimethylamino-propanol-(1) of which the hydrochloride melts at 162° to 163° C. and the methyl iodide at 184° to 185° C.

From cyclohexyl-methyl ketone and hexamethyleneimine hydrochloride there is obtained in the same way 1 - cyclohexyl-1-phenyl-3-hexamethyleneimino-propanol- (1) of which the hydrochloride melts at 226° to 227° C. and the methyl iodide at 162° to 164° C.

The reaction of 1-(Δ1'.2'-cyclo-octenyl)-methyl ketone, when using the hydrochloride of piperidine, leads to 1-(Δ1'.2'-cyclo-octenyl)-1-phenyl-3-piperidino-propanol-(1) of which the hydrochloride melts at 195.5° to 197° C.

Example 5

3.52 parts of the 1-(Δ1'.2'-cyclohexenyl)-3-hexamethylene-imino-propanone-(1) prepared as described in Example 2 are dissolved in 30 parts of alcohol, 0.8 part of palladium catalyst (1.5% of palladium on calcium carbonate) is added and the whole is shaken in an atmosphere of hydrogen at 22° C. under atmospheric pressure. After 1.1 mols of hydrogen have been absorbed for each mol of the compound, the catalyst is filtered off and the alcohol evaporated in vacuo. The hydrogenation product is reacted in the manner described in Example 3 with phenyl lithium (or phenyl magnesium bromide). 1-cyclohexyl-1-phenyl-3-hexamethyleneimino-propanol-(1) is obtained of which the hydrochloride melts at 226° to 227° C.

What we claim is:

1. A process for the production of a basic substituted phenyl-cycloalkenylpropanol which comprises heating a compound having the formula

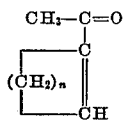

wherein $n$ is an integer of from 3 to 6, with formaldehyde and a hydrochloride of a secondary amino compound selected from the group consisting of saturated dialkyl amines and saturated cycloalkylamines containing from 4 to 6 carbon atoms in the ring, and reacting the resulting basic condensation product with an organometallic phenyl compound.

2. A process for the production of 1-(Δ1'.2'-cyclohexenyl)-1-phenyl-3-piperidino-propanol-(1) which comprises heating Δ1.2-cyclohexenyl-methyl-ketone in the presence of excess hydrochloric acid with paraformaldehyde and piperidine-hydrochloride and reacting the resulting 1-(Δ1'.2'-cyclohexenyl)-3-piperidino-propanon-(1) with phenylmagnesiumbromide.

3. A process for the production of 1-(Δ1'.2'-cyclohexenyl)-1-phenyl-3-hexamethyleneimino-propanol-(1) which comprises heating Δ1.2-cyclohexenyl-methyl ketone with aqueous formaldehyde solution and hexamethyleneimine-hydrochloride and reacting the resulting 1(-Δ1'.2'-cyclohexenyl)-1-phenyl-3-hexamethyleneimino-propanon-(1) with phenylmagnesiumbromide.

4. A process for the production of 1-(Δ1'.2'-cyclooctenyl)-1-phenyl-3-hexamethyleneiminopropanol-(1) which comprises heating an alcoholic solution of Δ1.2-cyclooctenyl-methyl ketone with paraformaldehyde and hexamethyleneimine-hydrochloride and reacting the resulting 1-(Δ1'.2'-cyclooctenyl)-3-hexamethyleneimino-propanon-(1) with phenyllithium.

5. A process for the production of 1-(Δ1'.2'-cyclooctenyl)-1-phenyl-3-piperidino-propanol-(1) which comprises heating an alcoholic solution of Δ1.2-cyclooctenyl-methyl-ketone with paraformaldehyde and piperidine-hydrochloride and reacting the resulting 1-(Δ1'.2'-cyclooctenyl)-3-piperidino-propanon-(1) with phenylmagnesiumbromide.

6. A member selected from the group consisting of compounds of the formula

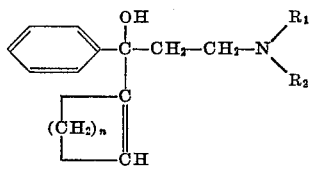

wherein $n$ is an integer of from 3 to 6 and $R_1$ and $R_2$ are selected from the class consisting of saturated alkyl groups and saturated hydrocarbon radicals which, together with the nitrogen atom, form a heterocyclic ring containing from 4 to 6 carbon atoms, and the salts of said compounds.

7. 1-(Δ1'.2'-cyclohexenyl)-1-phenyl-3-piperidino-propanol-(1).

8. 1-(Δ1'.2'-cyclooctenyl)-1-phenyl-3-piperidino-propanol-(1).

9. 1-(Δ1'.2'-cyclooctenyl)-1-phenyl-3-hexamethyleneimino-propanol-(1).

10. 1-(Δ1'.2'-cyclohexenyl)-1-phenyl-3-hexamethyleneimino-propanol-(1).

11. 1-(Δ1'.2'-cyclohexenyl)-1-phenyl-3-diethylamino-propanol-(1).

References Cited in the file of this patent

UNITED STATES PATENTS

| | | |
|---|---|---|
| 2,680,115 | Ruddy | June 1, 1954 |
| 2,716,121 | Denton | Aug. 23, 1955 |

FOREIGN PATENTS

| | | |
|---|---|---|
| 646,198 | Great Britain | Nov. 15, 1950 |
| 678,951 | Great Britain | Sept. 10, 1952 |

OTHER REFERENCES

Denton et al.: JACS, 71:2048–56 (1949).